July 9, 1946.  W. H. KITTO  2,403,602
SUCTION CLEANER
Filed Jan. 28, 1944   4 Sheets-Sheet 1

INVENTOR.
William H. Kitto
BY
Harry S. Ducasse
ATTY.

July 9, 1946. W. H. KITTO 2,403,602
SUCTION CLEANER
Filed Jan. 28, 1944 4 Sheets-Sheet 2

INVENTOR.
William H. Kitto
BY Harry S. Dunaser
ATTY

Patented July 9, 1946

2,403,602

UNITED STATES PATENT OFFICE 2,403,602

SUCTION CLEANER

William H. Kitto, Greentown, Ohio, assignor to The Hoover Company, North Canton, Ohio, a corporation of Ohio Application January 28, 1944, Serial No. 520,043

8 Claims. (Cl. 183—57)

The present invention relates to suction cleaners in general and more particularly to a suction cleaner incorporating a dirt separator with automatic cleaning features. More particularly the invention comprises a suction cleaner of the type including an initial dirt separator and a final dirt-separator in combination with means which automatically clean the final dirt separator returning the collected foreign material to the initial separator. Still more specifically the invention relates to a new and novel nozzle-actuating mechanism in a suction cleaner incorporating a dirt collecting filter and automatic means to clean same.

It is an object of the present invention to provide a new and improved suction cleaner. It is another object of the invention to provide a new and improved suction cleaner of the type incorporating initial and final dirt separators and automatic means to clean the final dirt separator and return the collected material to the initial dirt separator. A further object of the invention is to provide a suction cleaner incorporating a dirt separator and cleaning means for that separator which are actuated by new and novel means. A still further object of the invention is to provide a suction cleaner in which a dirt-collecting filter is cleaned by a movable nozzle which is driven by the motor stator, the motor armature being connected to the suction-creating means. Still another object of the invention is to provide a suction cleaner in which cleaning air is drawn through an initial separator by suction-creating means which exhaust clean air to a final dirt separator incorporating a filter, the suction-creating means being driven by the rotatable armature of a motor the stator of which propels the filter-cleaning nozzle relative to the filter. These and other more specific objects will appear upon reading the following specification and claims and upon considering in connection therewith the attached drawings to which they relate.

Referring now to the drawings in which preferred embodiments of the present invention are disclosed:

Figure 1:
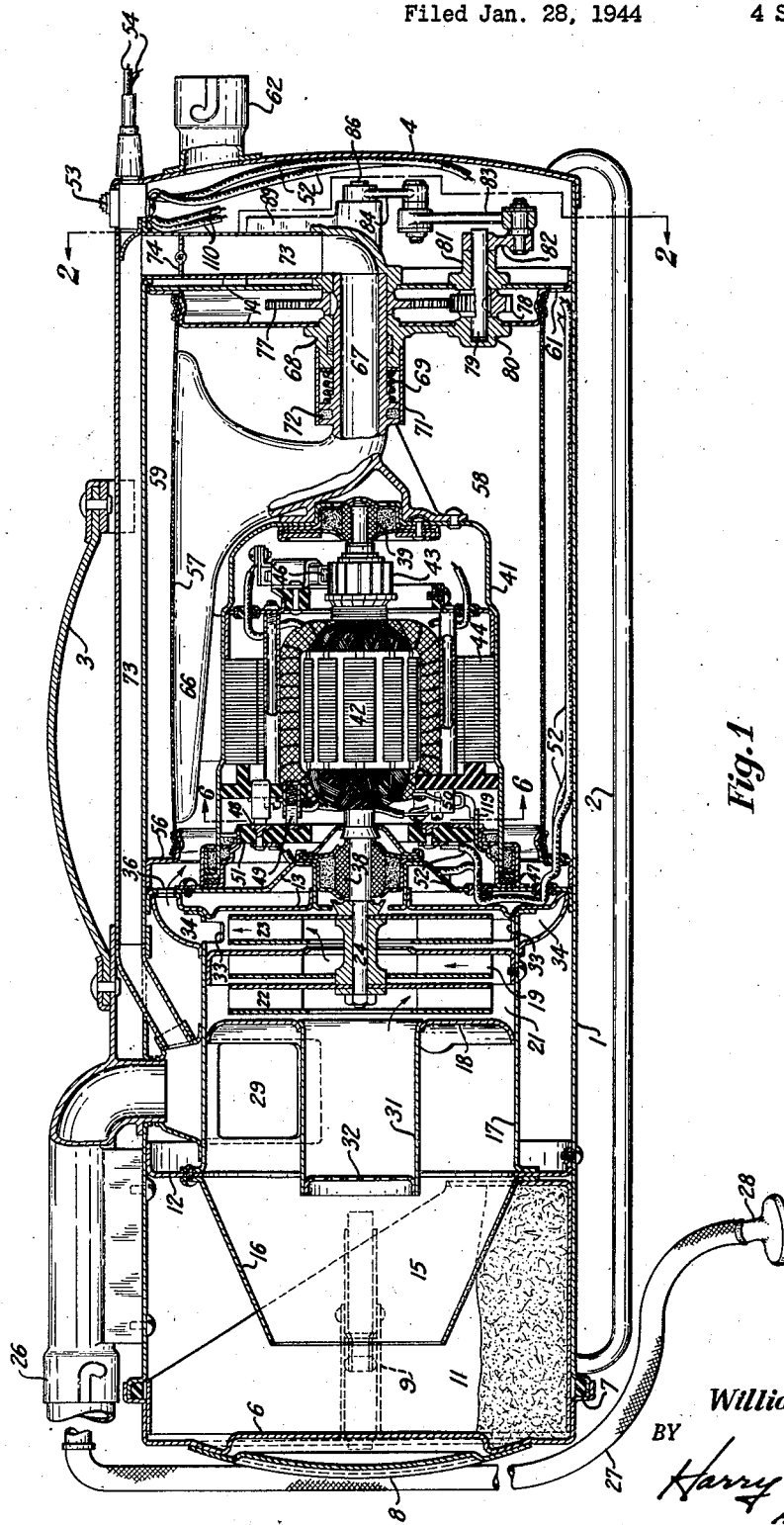
Figure 1 is a longitudinal section of the cleaner with the rear portion of the nozzle conduit shown upon the line 1—1 of Figure 2 to illustrate the gearing for driving the escapement mechanism.
Figure 2:
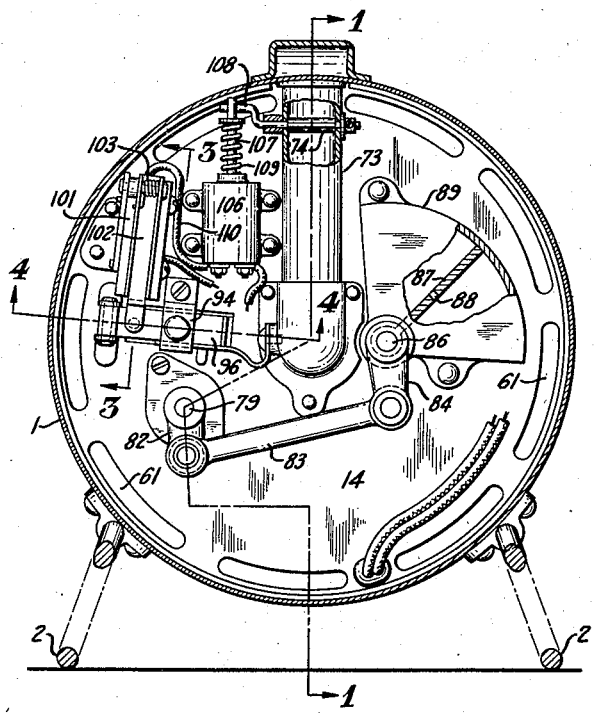
Figure 2 is a vertical transverse section upon the line 2—2 of Figure 1.
Figure 3:
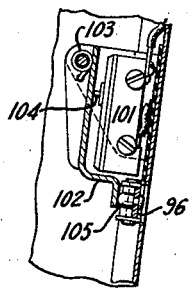
Figure 3 is a partial section upon the line 3—3 of Figure 2 and shows the solenoid-controlling switch.
Figure 4:
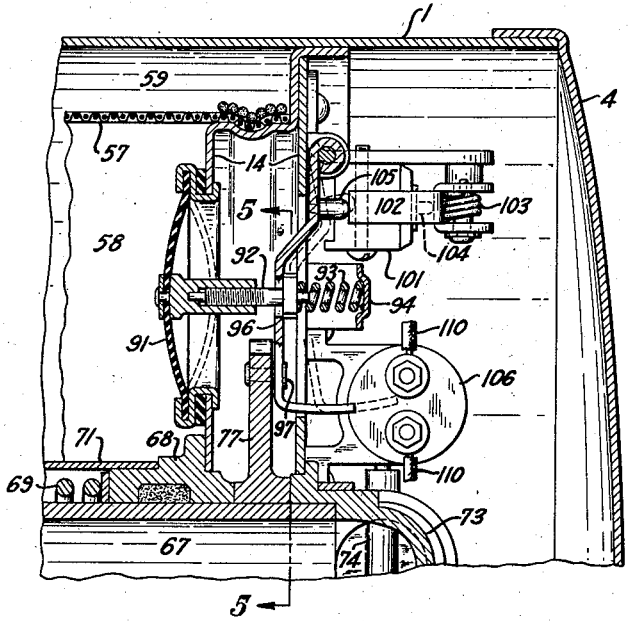
Figure 4 is a partial section upon the line 4—4 of Figure 2 and shows the pressure-responsive means which initiate the filter-cleaning operation.
Figure 5:
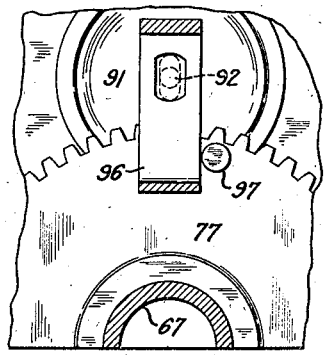
Figure 5 is a view looking in the direction of the arrows upon the line 5—5 of Figure 4 and shows the pressure-controlled locking means for the stator.

In cleaners of the type to which the present invention relates, to wit, suction cleaners incorporating a dirt separator with means to remove foreign material therefrom, the problem of actuating the separator-cleaning means automatically and at a desirable speed is a serious one. The normal suction-creating fan rotates at 10,000 R. P. M. or more and its driving motor is fixedly attached thereto. To actuate the cleaning means for the dirt separator from this motor requires some form of speed reduction which will enable the filter-cleaning nozzle to rotate at approximately 5 to 10 R. P. M., although slightly higher speeds are acceptable. In the present invention the filter-cleaning nozzle is driven by the field, usually known as the stator, of the motor which actuates the suction-creating fan unit. The stator is normally fixed in position but is rotatable during the operation of the filter-cleaning nozzle. Automatic means are provided which initiate and end the operation of the filter-cleaning nozzle.

Returning now to the drawings a preferred embodiment of the invention is illustrated in Figures 1 to 7, inclusive. The cleaner is seen to comprise a main elongated cylindrical casing 1 which is slidably carried by side runners 2 and which is provided on its top with a suitable handle 3. Cylinder 1 is closed at its ends by caps 4 and 6, the latter being sealed to the end of casing 1 in air tight relationship by a seal 7 and being provided with a suitable indented handle 8 which enables the operator to move the cap lengthwise of the casing after the latching means 9 have been manually released. A dust pan or container 11 is formed fixedly upon the removable end cap 6 and is removable therewith from the casing.

The interior of casing 1 is transversely divided by three spaced walls 12, 13 and 14, each of the latter two walls being a double wall with slightly spaced sides.

A truncated cone 16 extends forwardly from wall 12 which is centrally apertured to form, with the interior of a cylinder 17 extended between walls 12 and 13, a whirl chamber 15 the inner end of which is defined by a transverse wall 18. Within the cylinder 17 and rearwardly of the wall 18 is a stationary multi-vaned deflector 19 which cooperates with the casing 17 to form a two stage fan chamber 21. Upon opposite sides of the deflector 19 suction-creating fans 22 and 23 are carried by the extended end of a motor shaft 24, the motor being positioned upon the opposite side of the double wall 13 which forms the inner end of the fan chamber 21.

A port at 26, of a type adapted to seat removably a dusting tool hose 27 carrying a suitable nozzle 28 at its outer end, is connected by a tangentially extending inlet conduit 29 to the whirl chamber 15. The latter is itself open to the first stage of the fan chamber 21 through an elongated inlet 31 provided with a strainer 32 at its outer end. The first stage of the fan chamber connects through the centrally apertured deflector 19 to the second stage which is provided with a plurality of circumferential exhaust ports 33 opening into an enclosing circular conduit 34 leading to ports 36 in wall 13 in order that air exhausted from the fan chamber may pass rearwardly therethrough.

Figure 7:
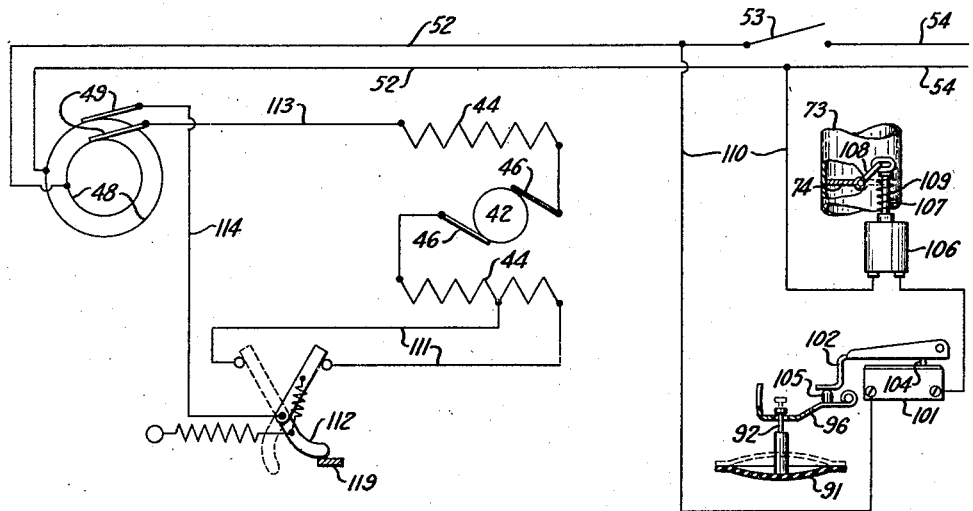
Figure 7 is a diagrammatic view of the electrical circuit of the machine.
Figure 6:
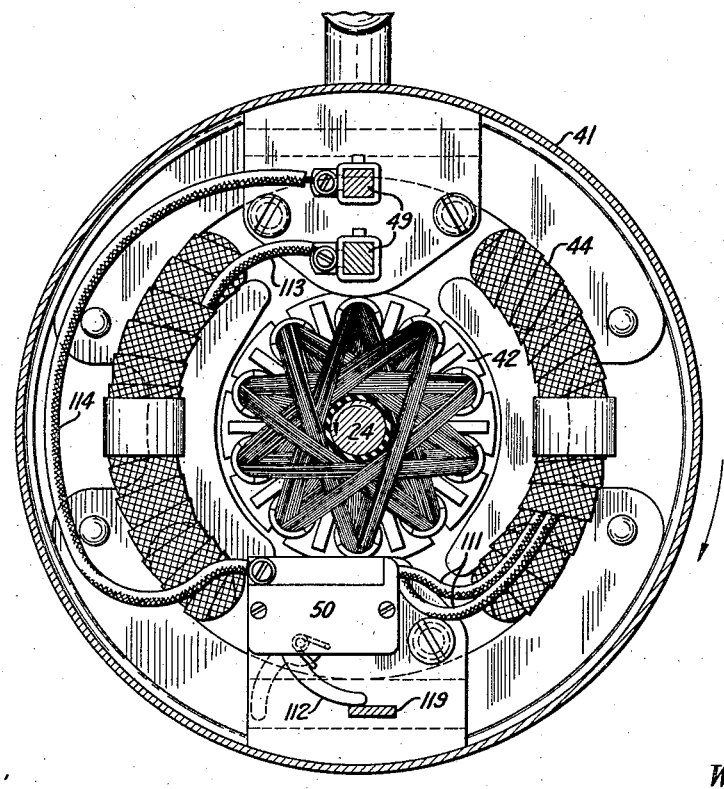
Figure 6 is a section through the motor upon the line 6—6 of Figure 1 and shows an end view of the motor field and armature.

The driving motor for the suction-creating fans 22 and 23 is positioned rearwardly of the double wall 13 with its shaft 24, being supported therein by a bearing 38. The rearward extremity of shaft 24 is supported in a second bearing 39 carried by the motor frame-casing 41. The motor armature and commutator 42 and 43, respectively, are of course fixed upon the shaft 24 and rotate with it while the motor field or stator 44 and commutator brushes 46 are carried by the frame-casing 41 which is itself rotatably mounted in a compound bearing structure 47 carried by the rearward face of the wall 13. As the motor field 44 is mounted for rotation it is necessary to provide a pair of stationary slip rings 48 and a pair of cooperating brushes 49 on the field. The rings are carried by an insulating plate 51 fixed to the wall 13 and are supplied with current through leads 52 which extend rearwardly along the underside of the main casing 1 to connect to a manually operable switch 53 which is itself connected to the incoming power leads 54. The electrical circuit of the motor is illustrated in Figure 7 and will be discussed later, it being sufficient here to point out that it is capable of giving two speeds of rotation and is controlled by a switch 50 carried by and rotatable with frame-casing 41.

Spaced concentrically within the main casing 1 and carried at one end by an inwardly-extending collar 56 adjacent wall 13 and at its opposite end upon a shoulder on the double wall 14 is a cylindrical filter 57. The chamber 58 within the filter 57 in which is located the driving motor may be referred to as the final filter chamber or dirt separator chamber. The chamber immediately outside thereof is known as the discharge chamber and bears the reference character 59. Filter chamber 58 is connected to the exhaust ports 33 of the fan chamber by the ports 36 and ring conduit 34, while discharge chamber 59 is open through ports 61 in the double wall 14 to the space between that wall and the rear cover 4. An exhaust port 62, similar to intake port 26 is formed in cover 4 and is adapted to receive and seat the cleaner end of a dusting tool unit when it is desired to use the machine as a blower.

Within the dirt separator chamber 58, and rigidly attached to the motor frame-casing 41, is a filter-cleaning nozzle 66. A hollow conduit 67 extends from the nozzle 66 in the longitudinal axis of the motor and to a central aperture in the double plate 14, being rotatably mounted in a suitable bearing 68. A coil spring 69 surrounding shaft 67 abuts the bearing 68 and a shoulder upon the shaft to take up end play. An enclosing sleeve 71 cooperates with a seal 72 to prevent the collection of foreign material upon the spring and the bearing 68. The rearward extremity of conduit 67 seats rotatably in a stationary conduit 73 which extends transversely to pass along the top of the casing and to connect to the inlet 29 of the whirl chamber 15. A pivoted valve 74 in conduit 73 controls the flow of air through the nozzle and the conduit.

As the nozzle 66 is fixedly connected to the motor stator at the frame-casing 41 thereof it is clear that both the stator and the nozzle must rotate in order for the nozzle to contact the entire inner surface of the filter 57 which must be cleaned from time to time. The normal driving motor has its stator fixed but in the present instance the frame-casing 41 is rotatably mounted, as described, at one end by the bearing 47 and at the opposite end through the nozzle 66 and conduit 67 in the bearing 68. It is clear that in motor operation the reactive forces present tend to rotate the field and frame-casing fixed thereto in one direction while the armature 42, together with the fans 22 and 23 secured thereto, is urged in the opposite direction. It is necessary, however, that the filter-cleaning nozzle rotate at a very slow speed and that this rotation take place only when it is desired to clean the filter. To provide this operation the following mechanism is provided.

A gear 77 is keyed to hollow shaft 67 inside the double wall 14 and is rotatable with the nozzle 66. In mesh with the gear 77 is a second small-diameter gear 78 keyed to a shaft 79 rotatable in bearings 80 and 81 in the sides of the double wall 14 and extended rearwardly from that wall to carry fixedly a crank arm 82. Crank arm 82 pivotally connects to a link 83 which at its opposite end pivotally connects to a second crank arm 84, as is clearly illustrated in Figure 2. Crank arm 84 is keyed to a shaft 86 which fixedly carries a valve element 87 formed with a small aperture 88 at a midpoint and movable angularly within a casing 89 with the walls of which it makes substantially sealing contact. Casing 89 is fixedly mounted on the rear face of double wall 14, is fluid and air tight, and is adapted to contain either a fluid or air, to provide a resistance to the arcuate movement of the flat valve 87. The valve element and its casing constitute an escapement which limits the speed of rotation of the motor stator and nozzle 66. The relationships of the crank arms 82 and 84 and the link 83 is such that the crank arm 82 rotates continuously during the rotation of the nozzle while the crank arm 84 which is fixedly connected to the valve 87 moves in an arcuate path between the limits shown in dotted lines in Figure 2. Clearly the selection of the gear ratio and of the size of the aperture 88 will determine the exact load placed upon the motor stator and so will determine its rotational speed when released.

It is not desired that the filter-cleaning nozzle 66 operate at all times but instead only when the collected foreign material upon the filter 57 makes the cleaning thereof necessary. The necessity for cleaning the filter is evidenced by an increase in the back pressure within the filter chamber 58. Accordingly a pressure-operated diaphragm 91 is provided in the inner face of double wall 14 which diaphragm carries a plunger 92 which at its headed outer end abuts a coil spring 93 positioned in a bracket 94 on the rear face of the wall 14. Spring 93 exerts a force to hold the diaphragm 91 in the position illustrated in full lines in Figure 4 which the diaphragm assumes when the pressure within the filter chamber 58 is not excessive. When the filter needs cleaning, however, the pressure therein builds up and the diaphragm 91 is forced outwardly, compressing the spring 93. As it does so its headed end moves rearwardly and permits the pivoted spring-biased lock lever 96 to move from the full line position to the dotted line position illustrated in Figure 4. In so moving the lock lever moves from abutting position with a pin 97 upon the large gear 77 fixed to nozzle 66 and that gear and the nozzle are then free to rotate. The speed of rotation is governed, as previously described, by the escapement the casing of which is indicated at 89.

In the normal operation of the cleaner no air flows through the filter-cleaning nozzle 66, passageway 73 leading thereto being closed by the butterfly valve 74. During the filter-cleaning operation and the nozzle rotation suction must be provided to the nozzle. To effect this result there is provided a current-controlling switch 101 which is spring-biased to closed position and which, with the filter-cleaning nozzle inoperative, is held in open position by a pivoted lever 102. The latter is itself biased by a coil spring 103 so as to hold the operating button 104 of the switch 101 in "open" position. The extremity of lever 102 abuts a pin 105 on the lock-lever 96 and as the latter pivots from its locking position to its open position when released by the diaphragm plunger 92 and as shown in full and dotted lines respectively in Figure 4, the spring-urged lever 102 is itself forced outwardly by the stronger lever 96 and button 104 is released from the depressing action of lever 102 and the switch moves automatically to closed position. Switch 101 is in the same circuit provided by leads 110 with an electrical solenoid 106 having a movable spring urged plunger 107 the slotted end of which is connected to a crank arm 108 fixed to the butterfly valve 74. Plunger 107 is normally held in its outer position by a coil spring 109 in which position the butterfly valve 74 is held in closed relationship to the air passageway 73. The current-conducting leads 110 are connected to the incoming current conductors 54 at the manually operable switch 53 and are in parallel with the lead 52 leading to the driving motor.

The operation of this first embodiment of the invention is as follows. To use the machine in ordinary cleaning operation the operator closes the switch 53 thereby energizing the driving motor and causing the armature 42 to rotate. The stator, comprising the field 44 and the frame-casing 41, are locked against rotation at the gear 77 by the cooperation of the lock lever 96 and the pin 97 upon the gear 77. The rotation of the motor armature 42 causes the suction-creating fans 22 and 23 to create a reduced pressure within the whirl chamber 15 which is effective to draw cleaning air from the dusting tool nozzle 28, through the hose 27, and into the whirl chamber. Foreign material entering with the air is separated from the air by centrifugal force during the high speed rotation of the air in the whirl chamber and travels forwardly to be deposited within the dirt receptacle 11 at the open end of the truncated cone 16 forming a part of the whirl chamber 15. The air, less practically all of the foreign material, passes rearwardly through the strainer 32, up the inlet 31 and into the fan chamber. It is exhausted from the second stage of the fan chamber at the exhaust outlet 33 into the ring conduit 34 to enter via the ports 36, the final filter chamber 58. The air, being under pressure, passes outwardly through the air-permeable but dirt-impermeable filter 57, into the discharge chamber 59 any remaining foreign material in the air, which at most comprises only a very small percentage of the total, being retained on the filter. The air in the discharge chamber 59 travels rearwardly through the ports 61 to be exhausted from the cleaner casing at the exhaust outlet 62.

After an extended period of cleaner use the collected foreign material upon the filter 57 results in an undue increase in the resistance of flow of air through the filter and a decrease in efficiency of the cleaning operation. Before this point is reached the increased back pressure in filter chamber 58 causes the spring-biased diaphragm 91 to move from the full line position, illustrated in Figure 4, to the dotted line position illustrated in the same figure. The opposing pressure of the coil spring 93 is overcome in this operation. As described, the movement of the diaphragm releases the lock lever 96 which moves from its locking position with respect to the pin 97 upon the large gear 77. That gear is then free to rotate and with it the filter-cleaning nozzle 66 and the motor frame-casing 41 which are all fixedly connected. The motor stator is rotated in a direction reverse to that of the direction of rotation of the armature 42 and at a speed determined by the escapement 89 to which the gear 77 is connected as described. The outward movement of the lock lever 96 into its releasing position permits the electrical switch 101 to move to closed position thereby energizing the solenoid 106. The solenoid armature 107 moves to its inner position and causes the butterfly valve 74 to move to open position. Thereupon and immediately the suction of the whirl chamber 15 is effective to draw air through the air conduits 73 and 67 and the filter-cleaning nozzle 66. The cleaning air is drawn from the discharge chamber 59 through the filter 57 and into the filter-cleaning nozzle and carries with it the foreign material collected upon the inside of the latter. This foreign material with its carrying stream of air traverses the passageways 67 and 73 and enters the whirl chamber 15, the dirt therein being separated from the air stream and deposited in the dirt container 11. The filter-cleaning operation continues until the pressure within the final filter chamber 58 has been reduced sufficiently to enable the coil spring 93 to move the diaphragm 91 to its original position illustrated in full lines in Figure 4. Thereupon the gear 77 is again locked by the lock lever 96 which is pulled into locking position by the headed plunger 92 of the diaphragm. Simultaneously the switch 101 is moved to open position by the lever 102 operating on plunger 104, the solenoid 106 is deenergized and valve 74 closes. Thereafter the nozzle is sealed from the whirl chamber and does not rotate, the machine continuing as a normal suction cleaner.

From time to time it is necessary for the dirt container 11 to be emptied and this is accomplished merely by releasing manually the latch 9, of which there may be one or more and pulling the end plate 6 longitudinally outward by the use of the depressed handle 8. After being removed the foreign material is readily emptied from the dirt container 11 in an obvious manner. Thereafter the container is replaced and the machine is again ready for operation.

Attention is directed to a refinement comprising the means by which the speed of rotation of the armature 42 is increased during the operation of the filter-cleaning nozzle in order that the suction-creating fans 22 and 23 can rotate at higher speed to create an increased suction in order that the cleaning effectiveness of the dusting tool nozzle 28 will not be reduced. To accomplish this result one winding of the field 44 is divided, as clearly illustrated in Figure 7, the leads 111 therefrom passing through a two position switch 50 to which is connected the lead 114 leading to the brush 49 riding upon the slip ring 48. The second slip ring 48 contacts a second brush 49 to which connects the lead 113 to the opposite side of the field 44. The stator-carried switch 50 includes a spring-biased actuating element 112 normally held in the full line position illustrated in Figure 7 in which the entire motor field is energized. Element 112 is positioned by means of a fixed abutment 119 so located below the motor as to contact the element 112 when the stator is held locked. Upon the nozzle being released by the movement of the lock lever 96, however, the motor stator begins to rotate and switch element 112 moves from the abutment 119 and immediately thereafter flies into its opposite position shown in dotted lines in Figure 7. In this second position part of the field winding is cut out and the motor rotates at increased speed as do the fans 22 and 23. At the end of the filter-cleaning operation the stator again takes its original fixed position as but one stop pin 97 is present upon the gear 77. In this position the abutment 119 again returns the switch to its full field position.

Figure 8:
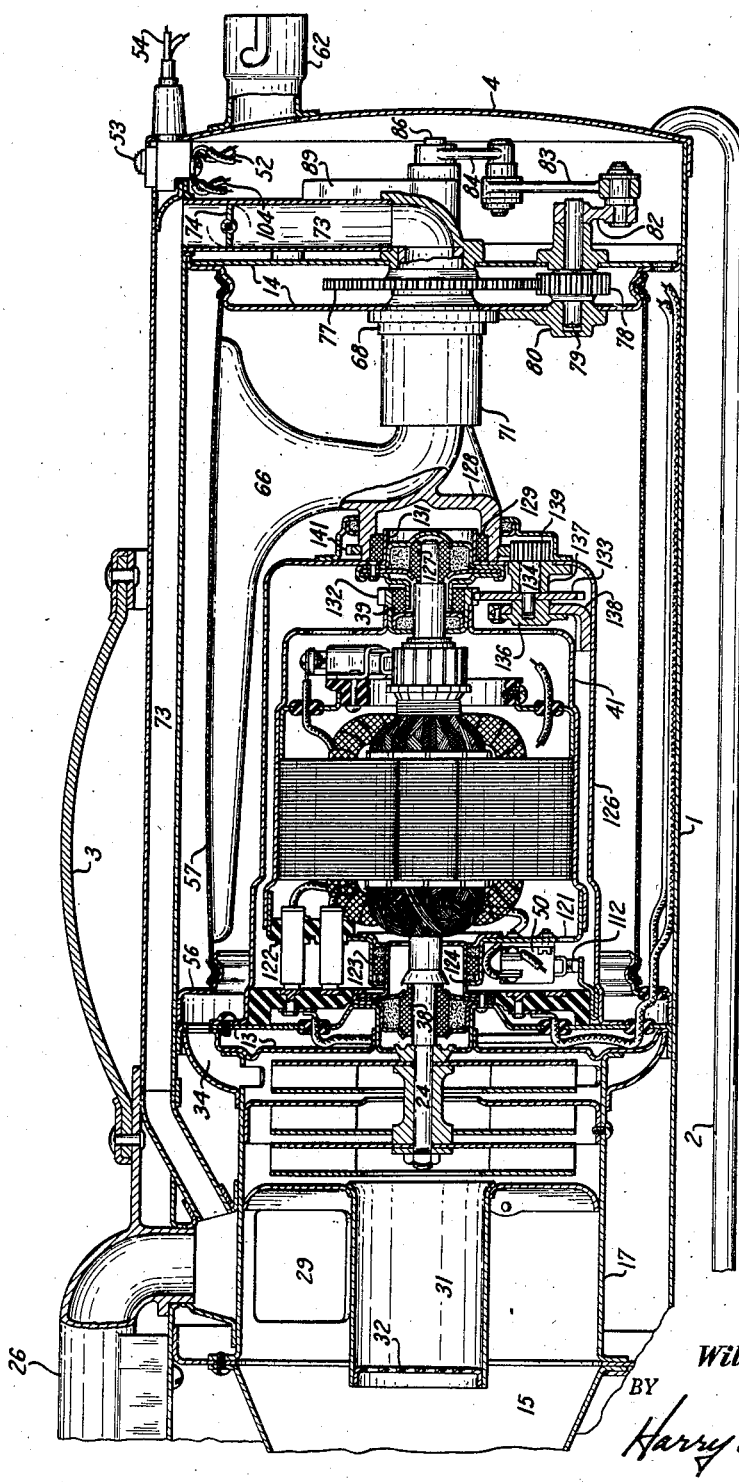
Figure 8 is a view similar to Figure 1 of a second preferred embodiment of the invention.

Referring now to Figure 8 a second preferred embodiment of the invention is illustrated which is distinguished from the first embodiment primarily in that gearing has been provided between the motor stator and particularly the frame-casing 41 and the filter-cleaning nozzle 66 in order to increase the reaction torque acting upon the nozzle. To accomplish this result certain structural changes have been embodied which will be described, it being understood that in other respects the construction is like in the first described embodiment.

In the second embodiment of the invention the motor frame-casing 41 is provided at its forward end with a forward wall 121 which carries an insulating block 122 in which the field brushes 49 are mounted. The two speed switch 50 is also mounted on the motor wall 121. At its center wall 121 is provided with an axially extending sleeve portion which rides upon a bearing 123 carried by a projecting sleeve 124 on the casing of bearing 38 in wall 13 and in which motor shaft 24 rotates. The motor stator does not rotate at a very high rate of speed and inexpensive bearing mountings are suitable.

In the first embodiment the rearward end of the motor frame-casing 41 was fixed to the rotatable nozzle 66 but in the present embodiment an enclosing fixed casing 126 is provided which is itself immovably mounted at its forward end upon the wall 13. Casing 126 is shaped similarly to the motor which it encloses and is provided in its rearward wall with a bearing 127 which rotatably supports the extended end of the motor shaft 24.

The filter-cleaning nozzle 66 is rotatably supported at the double wall 14 as in the first embodiment but at its side adjacent the motor instead of being fixedly connected to the frame-casing 41 is formed with an integral cylindrical cup portion 128 which is rotatably mounted upon a bearing 129 carried by an axially projecting neck 131 formed upon the supporting housing 126.

As the motor frame-casing 41 is not fixedly connected to the filter-cleaning nozzle which it is intended to drive means must be provided to transmit the reactive torque of the frame-casing to the nozzle. These driving means comprise a gear 132 rotatable with the frame-casing which meshes with a relatively large diameter gear 133 fixed upon a shaft 134. Shaft 134 is itself rotatably mounted in bearings 136 and 137 supported respectively in a bracket 138 and in the rear wall of the housing 126. At its rearward end shaft 134 carries a second gear 139 which meshes with a final gear 141 fixedly secured to the outer surface of the cup 128 on the nozzle 66. Through the gear train described rotation of the frame-casing 41 will be transmitted at greatly reduced speed to the nozzle with a resulting increase in the reaction torque on the nozzle.

The speed-controlling means described in connection with the first embodiment comprising the escapement 89 and its drive means are as illustrated in the first embodiment. Likewise the electrical control for this second embodiment and the actuation of the butterfly valve 74 remain unchanged.

The operation of the second embodiment of the invention is believed to be clear, it being necessary to point out only that rather than rotating fixedly with the motor frame-casing 41 the nozzle 66 rotates at a reduced speed being connected to the frame-casing through the reduction gearing described. The fixed connection of the frame-casing and the nozzle of the first embodiment is replaced by the presence of a housing 126 upon which both the frame-casing 41 and the nozzle 66 are rotatably mounted.

I claim:

1. In a suction cleaner of the type having an initial dirt separator, a suction-creating fan unit to draw air into and through said initial separator, and a final dirt separator to receive air exhausted from said fan unit; a motor to drive said fan unit including a plurality of individually rotatable electric-current-carrying parts, one of said rotatable parts being connected to said fan unit to actuate same, and cleaning means for said final dirt separator connected to a second rotatable part of said motor and actuated thereby.

2. In a suction cleaner of the type having an initial dirt separator, a suction-creating fan unit to draw air into and through said initial separator, and a final dirt separator to receive air exhausted from said fan unit, a motor to drive said fan unit including a rotor and a stator, said rotor being connected to said fan unit in driving relationship, means mounting said stator for rotation, and a cleaning element movable with respect to said final separator and connected to said stator and driven thereby.

3. In a suction cleaner of the type having an initial dirt separator, a suction-creating fan unit to draw air into and through said initial separator, and a final dirt separator to receive air exhausted from said fan unit and including an air permeable filter element; a motor to drive said fan unit including a rotor and a stator, said rotor being connected to said fan unit in driving relationship, means mounting said stator for rotation, releasable means normally retaining said stator against rotation, and a filter-cleaning nozzle connected to said initial separator and driven by said stator and movable relative to said filter to remove foreign material therefrom.

4. In a suction cleaner of the type having an initial dirt separator, a suction-creating fan unit to draw air into and through said initial separator, and a final dirt separator to receive air exhausted from said fan unit and including an air permeable filter element; a motor to drive said fan unit including a current-carrying rotor and a current-carrying stator, said rotor being connected to said fan unit in driving relationship, means mounting said stator for rotation, pressure-operated means controlled by the pressure in said final separator to lock said stator against rotation and adapted to release said stator for rotation in the presence of a predetermined pressure in said final separator, a filter-cleaning nozzle, movably mounted with respect to said filter and connected to said stator to be actuated thereby, and means controlled by said pressure-operated means to connect said nozzle to said initial separator.

5. In a suction cleaner of the type having an initial dirt separator, a suction-creating fan unit to draw air into and through said initial separator, and a final dirt separator to receive air exhausted from said fan unit and including an air permeable filter element; a motor to drive said fan unit including a current-carrying rotor and a current-carrying stator, said rotor being connected to said fan unit in driving relationship, means mounting said stator for rotation, a filter-cleaning nozzle fixedly mounted on said stator and rotatable therewith and over said filter element, and air-conducting means connecting said nozzle to said initial dirt separator.

6. In a suction cleaner of the type having an initial dirt separator, a suction-creating fan unit to draw air into and through said initial separator, and a final dirt separator to receive air exhausted from said fan unit and including a cylindrical air permeable filter arranged concentrically with respect to the axis of said fan unit; a motor to drive said fan unit including a rotor connected directly thereto and a stator, means rotatably mounting said stator, a filter-cleaning nozzle fixed to said stator and rotatable therewith, means to control the speed of rotation of said stator and nozzle, and means including pressure-operated means exposed to the air pressure acting on said filter to release and lock said stator and nozzle.

7. In a suction cleaner of the type having an initial dirt separator, a suction-creating fan unit to draw air into and through said initial separator, and a final dirt separator to receive air exhausted from said fan unit and including an air permeable filter element; a motor to drive said fan unit including a rotor and a stator, said rotor being connected to said fan unit in driving relationship, means mounting said stator for rotation, a filter-cleaning nozzle, means mounting said nozzle for rotation relative to said filter, speed-reducing gear means connecting said stator to said nozzle, means to restrain rotation of said stator and said nozzle, pressure-operated means exposed to the pressure acting on said filter controlling said last-mentioned means and adapted to actuate same to release said stator and nozzle in the presence of a predetermined pressure acting on said filter, and air-conducting means to convey air and collected foreign material from said nozzle to said initial separator.

8. In a suction cleaner of the type having an initial dirt separator, a suction-creating fan unit connected to said initial separator to draw air thereinto and to exhaust it therefrom, and a final dirt separator to receive air exhausted from said fan unit; a two speed motor including a rotor and a stator, said rotor being directly connected to said fan unit to drive same, means rotatably mounting said stator, a filter-cleaning nozzle connected to said stator and driven thereby relative to said final dirt separator to collect foreign material therefrom, air-conducting means connecting said nozzle to said initial separator, means normally locking said stator against rotation, pressure-responsive means controlled by the pressure acting on said final separator adapted to release said locking means upon a predetermined pressure existing in said final separator, and means to increase the speed of rotation of said motor upon the actuation of said pressure-responsive means.

WILLIAM H. KITTO.